July 3, 1934.   W. MORRIS   1,965,048
SEATING ARRANGEMENT FOR MOTOR VEHICLES
Filed Feb. 13, 1932   6 Sheets-Sheet 1

INVENTOR.
William Morris
by Eugene E. Stevens
His Attorney

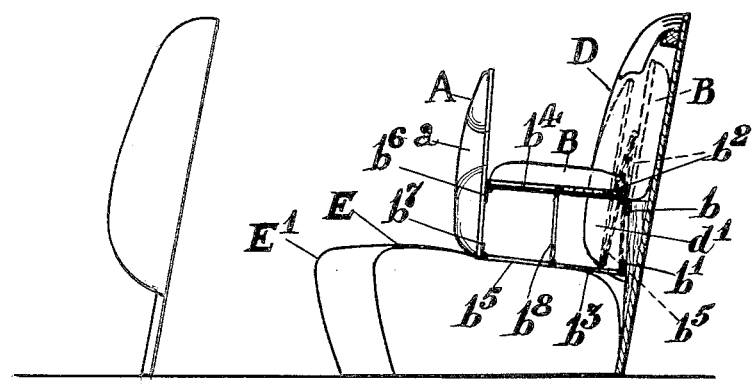
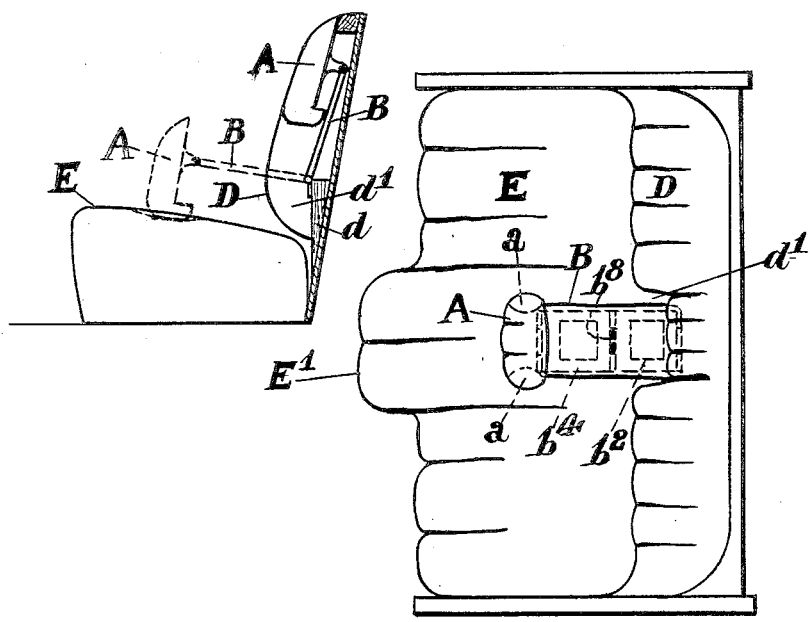

July 3, 1934.     W. MORRIS     1,965,048
SEATING ARRANGEMENT FOR MOTOR VEHICLES
Filed Feb. 13, 1932     6 Sheets-Sheet 3

INVENTOR.
William Morris
by Eugene Stevens
His attorney

July 3, 1934.    W. MORRIS    1,965,048
SEATING ARRANGEMENT FOR MOTOR VEHICLES
Filed Feb. 13, 1932    6 Sheets-Sheet 5

INVENTOR.
William Morris
by Eugene E. Stevens
His Attorney

INVENTOR.
William Morris
by Eugene L. Stevens
His attorney

Patented July 3, 1934

1,965,048

UNITED STATES PATENT OFFICE 1,965,048

SEATING ARRANGEMENT FOR MOTOR VEHICLES

William Morris, Burnley, England, assignor of one-third to Herbert Morris and one-third to Granville Morris, both of Burnley, England Application February 13, 1932, Serial No. 592,794
In Great Britain February 28, 1931

1 Claim. (Cl. 155—130)

This invention relates to a device that is designed to occupy an intermediate position on a motor vehicle seat for enabling three persons to sit comfortably on a seat that is designed for two.

According to this invention the device has a raised horizontal portion which forms an arm rest for the parties at either side of it and an upright portion which does not extend to the front edge of the seat and constitutes a back support, a sufficient portion of the seat in front of the back support being left for the third party to sit upon whilst the position of the back support is such that when the third party leans against it the whole of the weight of the third party is taken by the back support and not by the other two occupants of the seat. The device may constitute a loose fitting which can be taken off the seat when not required or it may constitute a permanent fitting and be so constructed that when it is not required for use it can be folded or tucked away in a recess formed in the seat or seat back in which position the front of the back support may come flush with the upholstery of the seat or seat back.

In the accompanying drawings:—

Fig. 7 is an elevation partly in section showing a construction of back support and arm rest adapted to be folded away in the seat back.

Fig. 8 is an elevation partly in section of a seat fitted with a modified construction of back support and arm rest.

Fig. 9 is a plan of the arrangement shown in Fig. 7.

Figure 14:
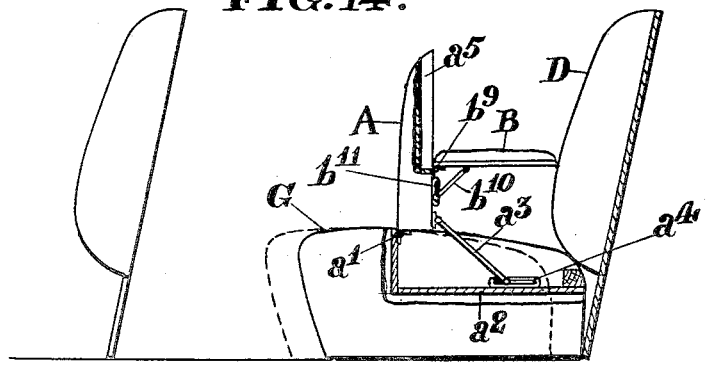
Fig. 14 is a similar view to Fig. 13 showing the back support and arm rest in the raised position.
Figure 15:
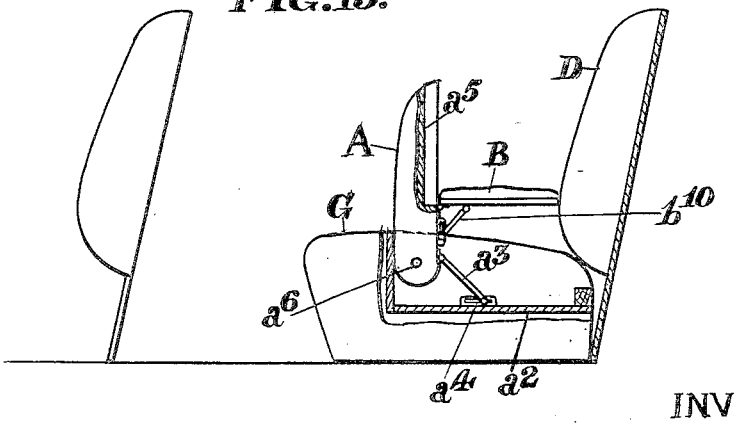

Fig. 15 is a similar view to Fig. 14 showing a slightly modified construction, and Figs. 16 and 17 and 18 and 19 show two further modified constructions.

Figure 1:
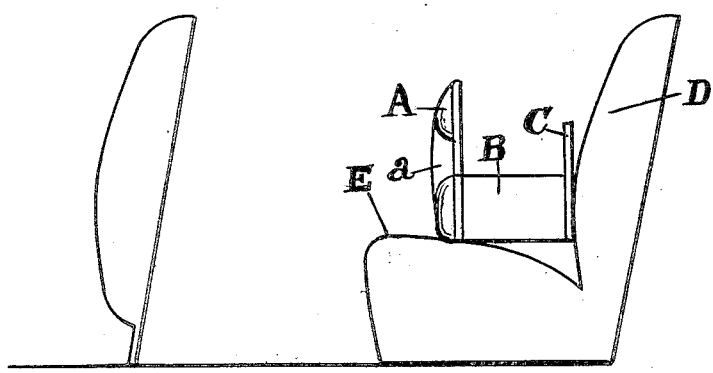
Fig. 1 is a side elevation of a vehicle seat provided with a back support and arm rest in accordance with this invention.
Figure 3:
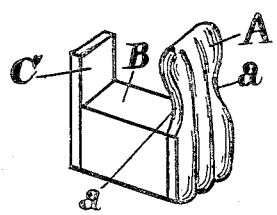
Fig. 3 is a perspective view of the back support and arm rest.
Figure 4:
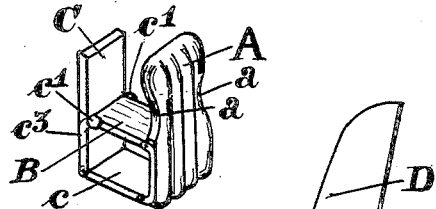
Figs. 4 and 5 show a back support and arm rest adapted to be folded up.
Figure 2:
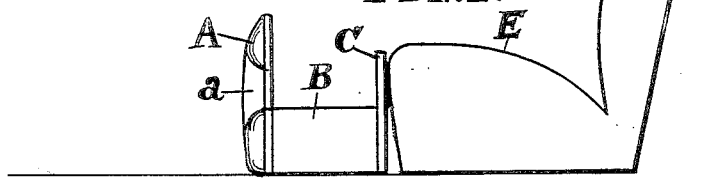
Fig. 2 is a side elevation showing the back support and arm rest placed on the floor of the vehicle for use as an emergency seat.
Figure 6:
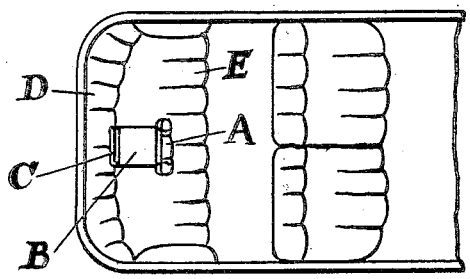
Fig. 6 is a plan of part of the body of a motor vehicle showing the rear seat fitted with a back support and arm rest in accordance with this invention.
Figure 5:
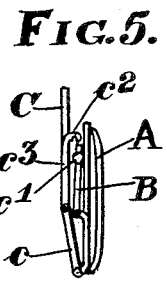

In Figs. 1 to 3 the device comprises a loose fitting having a back support A attached to a horizontal portion B fitted at the back with an upright member C to provide an increased bearing surface against the chair back D. The portions A and B may be upholstered and when the device is in the position shown in Figs. 1 and 3 sufficient space exists for a person to sit on the chair seat E and lean back on the support A, the persons sitting on either side of the device being able to use the part B as an arm rest. When the device is made as a loose fitting it can be placed on the floor of the vehicle as shown in Fig. 2 and used as an emergency seat for a child who can sit on it astride. In Figs. 4 and 5 the back support A is hinged to B which is in turn hinged to C. The bottom of the back support A is also hinged by a plate $c$ or side members to the upright member C. $c^1$ represents a clamping screw adapted to enter a recess $c^2$ Fig. 5 in a hinge member $c^3$ for locking the parts in the position shown in Fig. 4.

In Figs. 7 and 8 the device can occupy the position shown by the full lines or the folded position shown by the dotted lines in Fig. 7. For this purpose hinged fittings $b$, $b^1$ are fixed to a wooden support $d$ in a recess $d^1$ in the seat back D. Attached to the hinges $b$, $b^1$ are links or plates $b^2$, $b^3$ which may be in pairs and are made approximately half the length of the arm rest B, the upper pair of links or plates $b^2$ being secured to the underside of the framework of the arm rest which may be upholstered on the top. Hinged to the upper and lower pairs of links or plates $b^2$, $b^3$ are two similar pairs of links or plates $b^4$, $b^5$, the forward ends of which are attached to hinge fittings $b^6$, $b^7$ secured to the back support A. The inner ends of the links or plates $b^2$, $b^4$, $b^3$, $b^5$ are connected to a pair of vertical spacing links or plates $b^8$. The back support may be hollowed out at $a$ to provide more room for the arms of the occupants when resting on the arm rest B. To move the device to its inoperative position the back support A is lifted slightly to raise the arm rest B about the hinged fitting b and is then pushed backwards until the arm rest B comes to rest in a more or less upright position at the back of the recess $d^1$ in the seat back D with the front of the back support lying flush with the upholstery of the seat back as shown by the dotted lines in Fig. 7. The centre portion of the seat E is extended as shown at $E^1$ to provide further seating room for the person sitting in front of the back support.

In Fig. 7 the back support A is hinged to the front end of an arm support B that is hinged at b to a wood support d in a recess $d^1$ in the back of the seat D, the arm and back support when not required for use being folded into the recess in the back of the seat as shown.

Figure 10:
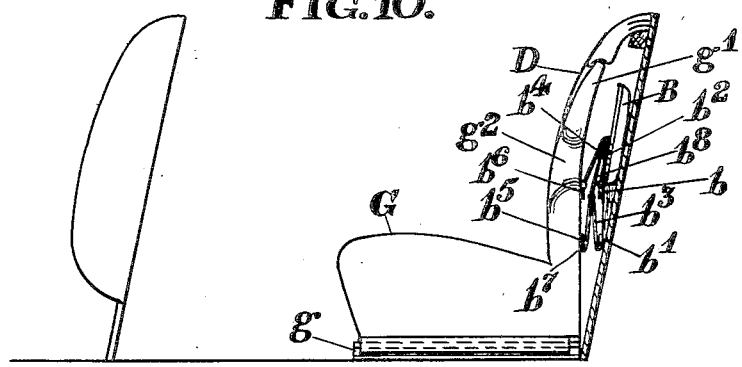
Fig. 10 is an elevation partly in section of a vehicle seat fitted with a centre portion that is adapted to occupy a rearward or forward position.
Figure 11:
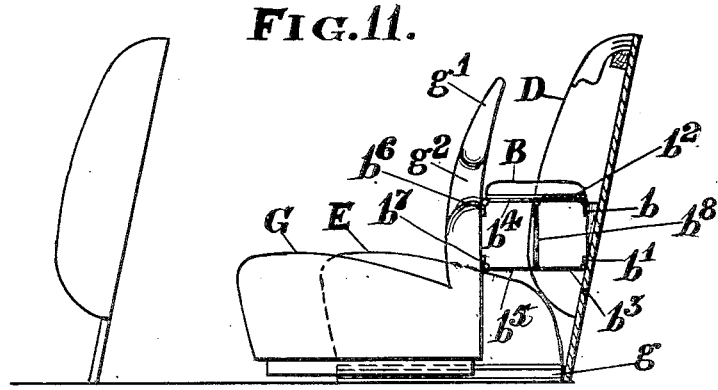
Fig. 11 is a similar view showing the centre part in its forward position.
Figure 12:
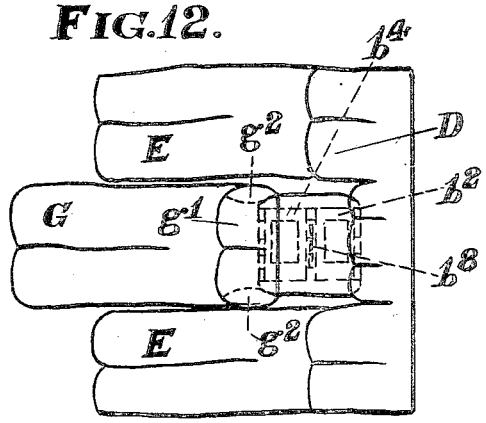
Fig. 12 is a plan of the device shown in Fig. 11.

In Figs. 10 to 12 the device comprises a chair G that is slidable on rails g in a recess in the middle of the seat E. The back $g^1$ of the chair G is hollowed out at $g^2$ in Fig. 11 and when such chair is not occupying a position for seating a third party it is pushed back until the seat portion G and the back $g^1$ lie flush with the seat E and seat back D as shown in Fig. 10. The arm rest B is hinged at $b^6$ to the back $g^1$ of the chair G and is also hingedly attached at its opposite end to the seat back D. It will be noted that the back D is provided with a recess whereby the seat back and arm rest can be folded away in which position the front of the back support $g^1$ comes flush with the upholstery of the seat back. When the back $g^1$ is extended forwardly of the back D the arm rest automatically comes into position by means of its hinged coupling and provides a rest for each side seat defined thereby.

Figure 13:
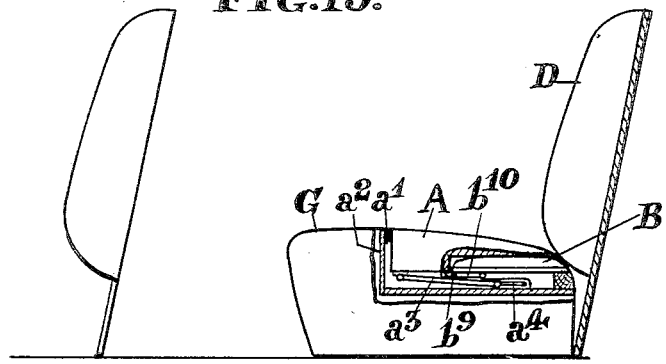
Fig. 13 is an elevation partly in section showing a seat fitted with a back rest and arm support adapted to be folded into the seat portion.

In Figs. 13 and 14 the intermediate portion G rests on the floor of the vehicle between the two seat portions E shown in Fig. 12 and the back support A is hinged at $a^1$ to a box like framework $a^2$ fixed in the seat portion G and forms a recess for the back support A when folded down. The back support is fitted with a slidable stay $a^3$ that can be locked in a slotted plate $a^4$ fixed in the structure $a^2$ for holding the back support in the position shown in Fig. 14. The arm rest B is hinged at $b^9$ to the back support A in which is a recess $a^5$ for the arm rest B. The latter can be locked and supported in its horizontal position by a slidable stay $b^{10}$ and slotted plate $b^{11}$. To put the arm rest and back support out of use the arm rest is folded upwardly into the recess $a^5$ and the stay $a^3$ is unlocked and the back support and arm rest are turned down into the recess formed in the intermediate portion G of the seat. To enable the back support A to be turned from one position to another the seat portion G is pulled outwardly to the position shown by the dotted lines in Fig. 14 and is then moved back again to the position shown by the full lines.

Fig. 15 is the same as Figs. 13 and 14 with the exception that the back support A is pivoted at $a^6$ instead of being hinged at $a^1$ to the top of the box like frame $a^2$.

Figure 16:
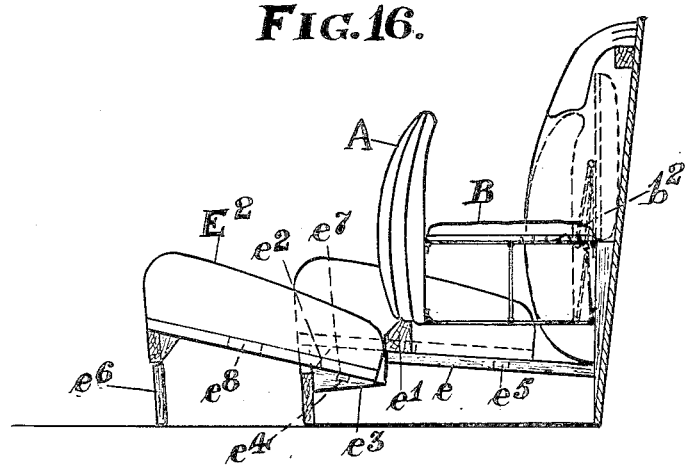
Figure 17:
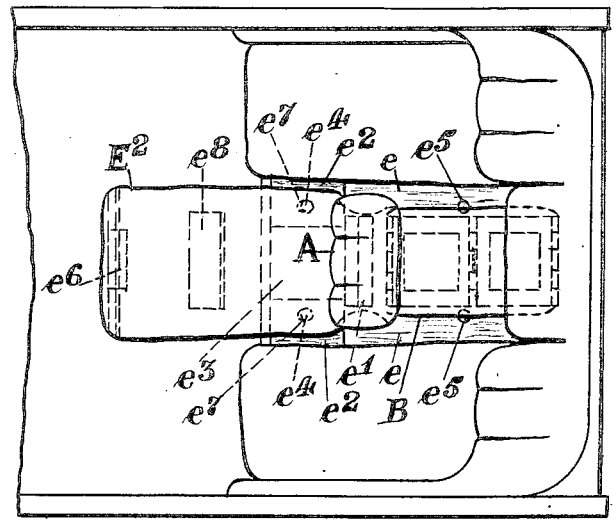

In Figs. 16 and 17 a central portion $E^2$ is detachably mounted on a rigid support e which has a raised support $e^1$ to support the back support A when the latter is in its forward position. The portion $E^2$ can occupy a rearward position so that it co-incides with both portions of the rear seat or it can be lifted and placed forward and its rear end dropped on to two inclined surfaces $e^2$ in a pocket or cavity $e^3$ in the front framework of the seat. The rear end of the central portion $E^2$ is provided with studs $e^4$ adapted to enter holes $e^5$ in the rigid support e and prevent the central portion $E^2$ from accidentally getting out of position. The front end of the central portion $E^2$ is fitted with a hinged member $e^6$ for supporting the portion $E^2$ when in its forward position. In this position the studs $e^4$ enter holes $e^7$ in the inclined surfaces $e^2$. The hinged member $e^6$ can be folded to enter the cavity $e^3$ when the portion $E^2$ is placed in its rearward position. In this position the raised support $e^1$ enters a cavity $e^8$ in the central portion $E^2$. The block $e^1$ may overhang the rear end of the cushion to support the latter without the hinged member $e^6$. In another modification the pocket $e^3$ may be dispensed with and the rear end of the portion $E^2$ may be recessed or stepped to rest on the board e and be maintained in position by studs $e^4$ and a hinged member $e^6$.

Figure 18:
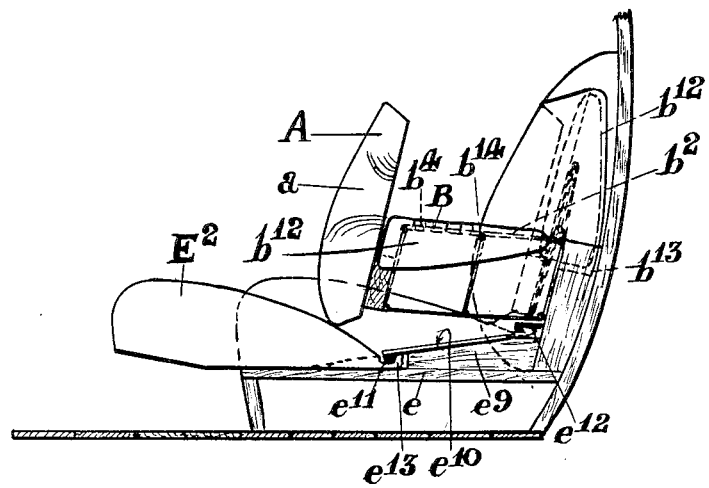
Figure 19:
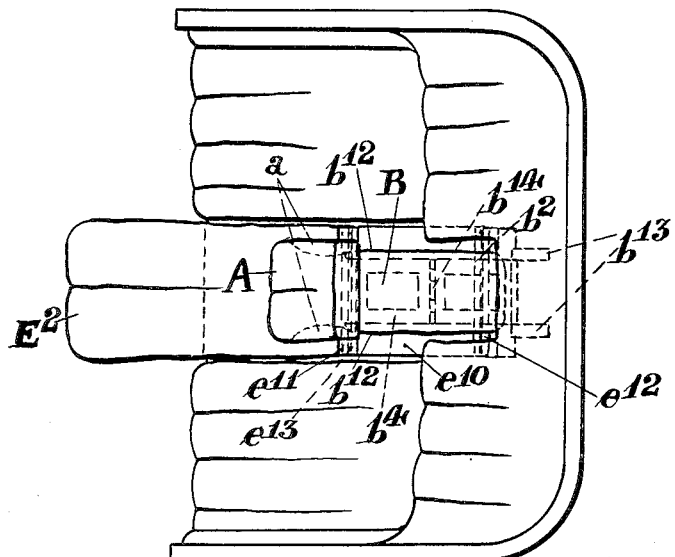

In the modified construction shown in Figs. 18 and 19 the rigid support e extends from the back to the front of the seat and is provided with two raised portions $e^9$ which act as a support for a metal plate $e^{10}$ that is formed or provided with a front hooked portion $e^{11}$ and a rear hooked portion $e^{12}$. The portion $E^2$ is formed or provided at the back with a hooked portion $e^{13}$ that can be engaged with the hooked portion $e^{11}$ when the portion $E^2$ is in its forward position and engaged with the hooked portion $e^{12}$ when the portion $E^2$ is in its rearward position. To move the portion $E^2$ from one position to another it is first tilted to disengage its hook $e^{13}$ from one or other of the hooks $e^{11}$, $e^{12}$ and then drawn forward or moved rearwardly as the case may be. In this example the arm rest B is shown screwed to the plate $b^4$ instead of to the plate $b^2$ as shown in Figs. 7, 11 and 16. The arm rest B is also provided with two side plates or flanges $b^{12}$ which enter slots or recesses $b^{13}$. In this construction to move the back support A from its forward position to its rear position the hinged joint $b^{14}$ is slightly raised and the back support A pushed back to the rear position shown by the dotted lines in Fig. 18, the various hinged members and the side plates $b^{12}$ taking up the position shown by the dotted lines.

What I claim as my invention and desire to secure by Letters Patent in the United States is:—

A seating device having a main seat and back provided with recesses, a secondary seat and back fitted into said recesses and normally flush with the main seat and back, said secondary seat and back adapted to be moved forwardly to support a person, extensible means carrying an arm rest and connected to the rear of the secondary back and in the recess in the main back.

WILLIAM MORRIS.